(12) United States Patent
Cavanagh et al.

(10) Patent No.: US 10,285,536 B2
(45) Date of Patent: May 14, 2019

(54) FOOD OR BEVERAGE PREPARATION MACHINE WITH ANTISCALING PIPE SYSTEM

(71) Applicant: NESTEC S.A., Vevey (CH)

(72) Inventors: John Patrick Cavanagh, Lausanne (CH); Akos Spiegel, Chables (CH)

(73) Assignee: Nestec S.A., Vevey (CH)

( * ) Notice: Subject to any disclaimer, the term of this patent is extended or adjusted under 35 U.S.C. 154(b) by 508 days.

(21) Appl. No.: 14/905,536

(22) PCT Filed: Jul. 15, 2014

(86) PCT No.: PCT/EP2014/065178
§ 371 (c)(1),
(2) Date: Jan. 15, 2016

(87) PCT Pub. No.: WO2015/007747
PCT Pub. Date: Jan. 22, 2015

(65) Prior Publication Data
US 2016/0174759 A1    Jun. 23, 2016

(30) Foreign Application Priority Data

Jul. 17, 2013  (EP) .................................... 13176934

(51) Int. Cl.
*A47J 31/60*   (2006.01)
*A47J 31/40*   (2006.01)
*A47J 31/46*   (2006.01)

(52) U.S. Cl.
CPC ............. *A47J 31/60* (2013.01); *A47J 31/407* (2013.01); *A47J 31/462* (2013.01)

(58) Field of Classification Search
CPC ......... A47J 31/407; A47J 31/462; A47J 31/60
(Continued)

(56) References Cited

U.S. PATENT DOCUMENTS 5,687,995 A * 11/1997 Mori ..................... F16L 13/004
156/86
6,286,416 B1 * 9/2001 Van Der Meer ........ A47J 31/54
99/290
(Continued)

FOREIGN PATENT DOCUMENTS

CN            2553348         5/2003
CN          202057223        11/2011
(Continued)

OTHER PUBLICATIONS

European Office Action for Application No. 14 739 442.3-1656 dated Mar. 1, 2017.

*Primary Examiner* — Jimmy Chou
(74) *Attorney, Agent, or Firm* — K&L Gates LLP

(57) ABSTRACT

The present invention concerns a food or beverage preparation machine (M) comprising a casing, a mineralized fluid source (1), a receptacle (10) adapted for functionally enclosing at least one food or beverage ingredient container (C), means (3) for conducting said mineralized fluid (13) from said source (1) to the interior of said capsule (C), optionally a heating and/or chilling device (4), and a fluid pipe system (2, 20, 21, 22) that fluidly connects said source (1), said conducting means (3), said receptacle (10), and said heating and/or chilling device (4), characterized in that at least one portion of the fluid pipe system (2, 20, 21, 22) and/or conducting means (3), and/or heating/chilling device (4) is made of a smart memory alloy (SMA), or smart memory polymer (SMP) designed to reversibly expand or contract above a defined temperature threshold in order to negate the buildup of scale or other deposits on the surfaces in contact with the mineralized fluid (13) by mechanical action, during operation of said machine.

12 Claims, 2 Drawing Sheets

(58) Field of Classification Search
USPC .......................... 99/295, 300, 307; 426/115
See application file for complete search history.

(56) References Cited

U.S. PATENT DOCUMENTS

| | | | | |
|---|---|---|---|---|
| 6,672,200 | B2* | 1/2004 | Duffy | A47J 31/0642 222/146.5 |
| 6,763,759 | B2* | 7/2004 | Denisart | A47J 31/36 99/295 |
| 7,523,695 | B2* | 4/2009 | Streeter | A47J 31/32 99/283 |
| 7,607,634 | B2* | 10/2009 | Browne | F16K 7/02 138/46 |
| 7,640,845 | B2* | 1/2010 | Woodnorth | A47J 31/46 99/280 |
| 7,981,451 | B2* | 7/2011 | Ozanne | B65D 85/8043 426/79 |
| 8,039,034 | B2* | 10/2011 | Ozanne | A47J 31/0615 426/425 |
| 8,151,694 | B2* | 4/2012 | Jacobs | A47J 31/46 426/433 |
| 8,475,860 | B2* | 7/2013 | Colantonio | A47J 31/22 426/431 |
| 2002/0144604 | A1* | 10/2002 | Winkler | A47J 31/3695 99/302 R |
| 2004/0064098 | A1* | 4/2004 | Cuschieri | A61M 25/0084 604/158 |
| 2005/0150391 | A1* | 7/2005 | Schifferle | A47J 31/0673 99/295 |
| 2007/0185374 | A1* | 8/2007 | Kick | A61B 17/00234 600/37 |
| 2008/0092747 | A1* | 4/2008 | Yoakim | A47J 31/36 99/295 |
| 2010/0018404 | A1* | 1/2010 | Villa | A47J 31/46 99/288 |
| 2010/0218684 | A1* | 9/2010 | Etter | A47J 31/542 99/288 |
| 2010/0239734 | A1* | 9/2010 | Yoakim | A47J 31/22 426/433 |
| 2010/0282088 | A1* | 11/2010 | Deuber | A47J 31/52 99/281 |
| 2010/0282090 | A1* | 11/2010 | Etter | A47J 31/542 99/288 |
| 2011/0041700 | A1* | 2/2011 | Epars | A47J 31/06 99/295 |
| 2011/0061534 | A1* | 3/2011 | Ozanne | A47J 31/46 95/243 |
| 2012/0058226 | A1* | 3/2012 | Winkler | A47J 31/3695 426/79 |
| 2012/0308688 | A1* | 12/2012 | Peterson | A47J 31/002 426/86 |
| 2012/0321756 | A1* | 12/2012 | Estabrook | A47J 31/407 426/115 |
| 2013/0177677 | A1* | 7/2013 | Ozanne | B65D 85/8043 426/115 |
| 2013/0209636 | A1* | 8/2013 | Cominelli | A47J 31/46 426/431 |
| 2014/0272023 | A1* | 9/2014 | Zimmerman | A47J 31/56 426/231 |

FOREIGN PATENT DOCUMENTS

| | | | |
|---|---|---|---|
| CN | 103090718 | | 5/2013 |
| CN | 103090718 A | * | 5/2013 |
| EP | 2147621 | | 1/2010 |
| EP | 2460449 | | 6/2012 |
| WO | 2008139173 | | 11/2008 |

* cited by examiner

FOOD OR BEVERAGE PREPARATION MACHINE WITH ANTISCALING PIPE SYSTEM

CROSS REFERENCE TO RELATED APPLICATIONS

The present application is a National Stage of International Application No. PCT/EP2014/065178, filed on Jul. 15, 2014, which claims priority to European Patent Application No. 13176934.1, filed Jul. 17, 2013, the entire contents of which are being incorporated herein by reference.

FIELD OF THE INVENTION

The present invention concerns a food or beverage preparation machine, having a fluid pipe system with anti-scaling properties.

BACKGROUND OF THE INVENTION

In the known food or beverage machines, in particular for home use, there are scaling issues due to the deposit of minerals contained in the mixing fluid used for the food or beverage preparation. Typically, minerals such as calcium build up in the fluid pipe system of the machine and possible to its other functional components which are in contact with said mineralized fluid, such as the fluid pump, or the fluid heater, eventually leading to blockage of the machine. More precisely, deposits of minerals on the contact surface of the fluid conducting elements of the machine occurs predominantly in the portions of said fluid conducting elements wherein said fluid is subject to thermal changes or turbulent flows in particular at sudden conduit diameter changes.

In existing solutions, descaling of the pipe system of the machine is performed by using chemicals. However, this is disadvantageous because it requires purchase of an extra item by the consumer. Moreover, it is mildly hazardous and therefore requires that the machine be flushed several times after use to purge the system of the chemicals. This chemical descaling process requires frequent and repeated applications, and requires the consumer to remember and organise to perform these descaling cycles as appropriate. Moreover, if the consumer forgets about descaling, the machine will inevitable block after some time, and may become impossible to repair. This undue burden on the consumer is not very user-friendly, hence undesirable.

Alternatively to the known chemical descaling technique to be performed by the user, another possibility exists to descale the machine fluid pipe system, which is the mechanical technique. In this case, a mechanical element is forced through at least some portions of the fluid pipe system, for instance the fluid injection needle which injects the fluid within the ingredient capsule. Alternatively to the manual operation, the mechanical descaling of some portions of the fluid pipe system can be performed in an automatic manner, when the machine is operated. Such an automated mechanical descaling is described for instance in the applicants European patent publication EP 2460449 A1. However, although such a technique has certain advantages, it adds extra complexity to the machine and thus injects extra potential for failure into the product, as well as adding extra cost on the machine, which makes the same machine more expensive to purchase for the consumer.

Having regard to the existing machines and descaling techniques which are discussed above, it appears that there is a need for a beverage preparation machine that requires little operation by the consumer to perform a descaling process, while being simple and inexpensive to the manufacture, and requires little or no maintenance.

SUMMARY OF THE INVENTION

The main objective mentioned above is met with a food or beverage preparation machine comprising a casing, a mineralized fluid source, a receptacle adapted for functionally enclosing at least one food or beverage ingredient container, means for conducting said mineralized fluid from said source to the interior of said capsule, optionally a heating and/or chilling device, and a fluid pipe system that fluidly connects said source, said conducting means, said receptacle, and said heating and/or chilling device.

The machine according to the invention is characterized in that at least one portion of the fluid pipe system, and/or the fluid conduits of the conducting means, and/or the fluid conduits of the heating/chilling device is made of a smart memory alloy (SMA), or smart memory polymer (SMP) designed to reversibly expand or contract above a defined temperature threshold in order to negate the build-up of scale or other deposits on the surfaces in contact with the mineralized fluid by mechanical action, during operation of said machine.

In a preferred embodiment of the invention, the portion of the fluid pipe system, and/or conducting means, and/or heating/chilling device made of SMA or SMP is the internal surface of said fluid pipe system, and/or conducting means, and/or heating/chilling device, which is in direct contact with the mineralized fluid during operation of the machine. Said internal surface made of SMA or SMP can be metal coating or a built-in metallic layer of said of the fluid pipe system, and/or conducting means, and/or heating/chilling device. Alternatively, the fluid pipe system, and/or conducting means, and/or heating/chilling device can be made integrally of SMA or SMP.

A shape-memory alloy (or "SMA", smart metal, memory metal, memory alloy, muscle wire, smart alloy) is an alloy that "remembers" its original, cold-forged shape, returning to the pre-deformed shape when heated. This material is a lightweight, solid-state alternative to conventional actuators such as hydraulic, pneumatic, and motor-based systems.

In the present invention, suitable SMAs are made from Nickel, Titanium alloy (NiTi), already food safe and both materials already exhibit greater than normal resistance to the buildup of calcium due to natural properties related to their surface texture and some electrochemical effects. Shaped memory alloy expand (exhibiting superelastic properties) to a preprogrammable mechanical shape when heated above an engineered temperature, and then return to their original shape when cooled. This mechanical expansion and contraction results in a dynamic surface environment which significant calcium deposits would find it difficult to adhere to.

Preferably, said mineralized fluid source is a fluid reservoir, and also preferably, said conducting means is a pump.

Alternatively though, the conducting means can be a pump actuator adapted to actuate pump means built-in the container, as described in the applicant's European patent application EP AN 13175955.7.

In a highly preferred embodiment of the invention, the SMA or SMP transition temperature is comprised in the range of 50° C. to 120° C., preferably between 60° C. and 95° C., more preferably between 65° C. and 80° C.

Advantageously, said smart memory alloy is selected within the list of: Titanium-Nickel alloy (NiTi), copper-aluminium-nickel, and SMAs created by alloying zinc, copper, gold and iron.

Preferably, the mineralized fluid is water.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
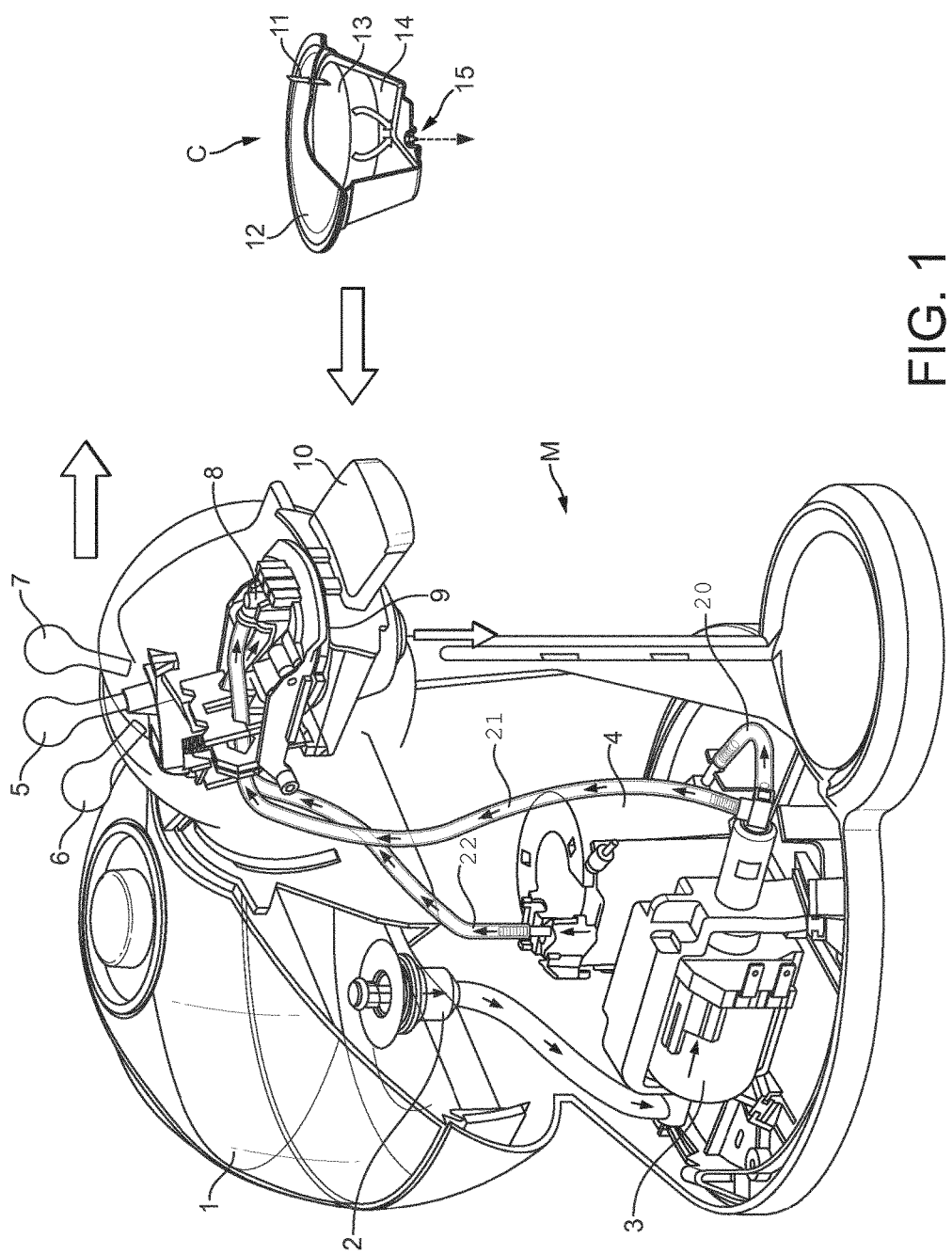
FIG. 1 is a schematic perspective cut view showing the interior of a food or beverage preparation machine.

The machine M according to the invention illustrated in FIG. 1 is a beverage preparation machine for use with a single use ingredient capsule C.

The machine M comprises a water reservoir removably attached to the machine body, and fluidly connected through a fluid link pipe 2 to a fluid pump 3 that is suitable for circulating the water from the reservoir, through the machine functional elements, towards the capsule C when said capsule is functionally inserted with said machine M. The pump 3 is for instance a solenoid piston pump. However, other types of pump means could also be used.

The machine M further comprises two pipes that extend from the pump output end, each of which corresponds to an alternative route for the water flow, depending on the selection of temperature that is chosen by the user, as will described hereafter. The first fluid link pipe 20 links the pump 3 to the heating element 4, and therefore aims at conducting water expelled by said pump 3 towards the heating element 4 through which said water is heated into fluid conduits, to a temperature suitable with the preparation of hot drinks. Said heated water is then conveyed from the heating element 4 towards the injection needle 11 of the machine, through a hot water conducting pipe 22.

The alternative fluid pipe 21 extends from the pump outlet directly towards the flow route selector valve 8 and injection needle 11 as shown in FIG. 1. In other terms, the cold water pipe 21 bypasses the heating element 4 and aims at conducting cold water expelled by the pump directly to the capsule C, via the flow route selector valve 8 and injection needle 11.

The capsule C comprises capsule walls, a top pierceable injection wall 12 which is to be pierced by the water injection needle 11 of the machine M, when said capsule is functionally inserted within the machine M. The water 13 that is injected therein, passes through a bed of ingredient 14, for instance a bed of roast and ground coffee, or mixes with a soluble ingredient (coffee or milk), to create a beverage product that is then dispensed through a dispensing opening 15 of the capsule C, as illustrated with a dotted arrow in FIG. 1.

When the capsule C is loaded within the capsule holder 10, and said capsule holder 10 is inserted functionally inside the machine, the machine can be started for the preparation of a beverage by actuation with the selector lever 5. Water 13 is then withdrawn from the reservoir 1 and circulates through the pipes and functional elements of the machine (pump, heating element, flow route selector valve, injection needle) as illustrated with arrows in FIG. 1. There are two alternative routes for the water, depending on the position of the selection lever 5 when a beverage preparation cycle is started.

In the first case, if the selector lever is positioned in its cold position 6, water will not be circulated through the heating element 4. In this case, the flow of water 13 bypasses the heating element 4 and circulates from the reservoir 1, through the pipe 2, then through the pump 3 and through the cold pipe 21 towards the flow route selector valve 8 and injection needle 11, through which it passes and is injected into the capsule C.

In the second case, if the selector lever 5 is on the hot position 7, the flow of water 13 circulates from the reservoir 1, through the pipe 2, then through the pump 3 and through the pipe 20 that links the pump 3 and the heating element 4, and the from the heating element 4 through the hot water pipe 22 towards the flow route selector valve 8 and injection needle 11, through which it passes and is injected into the capsule C.

As a minimum, the water conducting elements of the machine which are manufactured with SMA or SMP per the invention, are those which conduct the water in a heated state, and/or exhibits a sudden diameter change thereby promoting a turbulent flow of said water therein. Those are particularly the internal conduits of the heating element, the hot water conducting pipe portion 22, and the injection needle 11.

According to the present invention, the SMA (Smart Memory Alloy) or SMP (Smart Memory Polymer) changes shape when heated and returns to its original room temperature shape when temperature within said pipe decreases below a transition temperature that is comprised between 65° C. and 80° C. Any scale which had deposited would find it difficult to adhere to the surface during the next heating cycle when the material expands again as the internal surfaces of the pipes expand and then contract, hence providing a mechanical scrubbing effect to the minerals deposits.

Importantly, the SMA components of the machine according to the present invention can be heated by the water circulating through them (this is a passive heating of the SMA), or alternatively, said SMA components, or at least some of them, can be actively heated by heating means such as a resistance whose temperature is controlled and actuated by a temperature controller.

In some cases, the machine according to the present invention can feature a water injection needle 11 that is made entirely out of SMA and/or SMP material.

Figure 2:
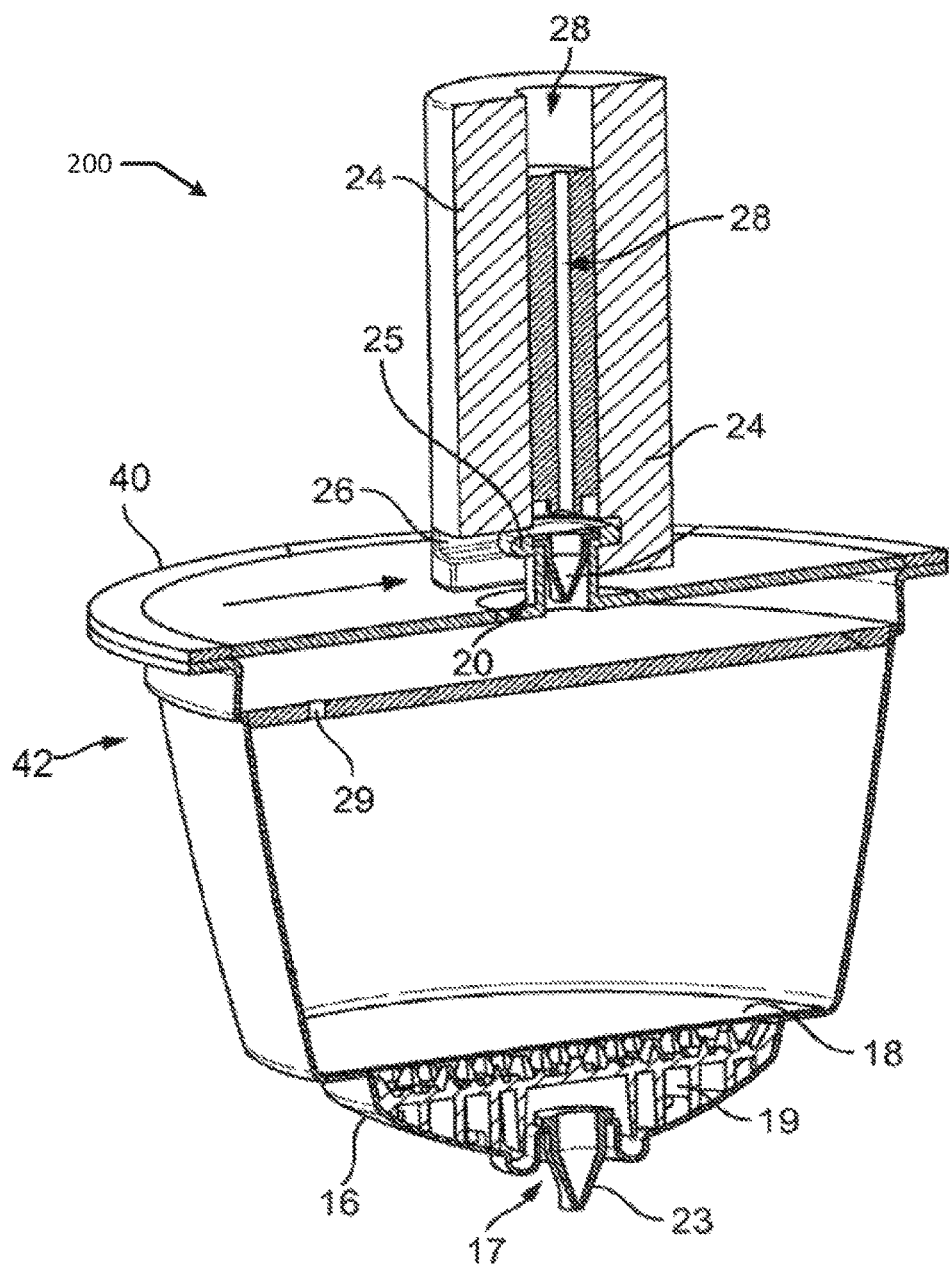
FIG. 2 is a schematic perspective cut view showing an exemplary capsule with an exemplary pump actuator.

As shown in FIG. 2, the stretchable injection wall 40 comprises mechanical connection means suitable to be mechanically connected to a pump actuator 24 of the machine by a horizontal sliding movement of the capsule relative to the actuator 24. More precisely, the mechanical connection means comprises a rigid catching circular protrusion 25 able to slide into a cooperating connection groove 26 of the pump actuator 24.

Importantly, the pump integrated in the capsule according to the present invention can be actuated manually, but of course, it is preferably actuated automatically, by connecting the capsule to the actuator 24 which is present in the machine. The actuator is moved by an electric motor—not illustrated in the drawing—which provides vertical back and forth movements to the actuator 24.

In other terms, when the food and beverage container—for instance a coffee capsule—is functionally inserted into the food and beverage machine, two types of connections are performed. The first connection is a fluid connection which links the container to the fluid pipe system of the machine in such a way that fluid can circulate from the fluid source of the machine—for instance a water reservoir—towards and through the container compartment, wherein said fluid mixes as a mixing ingredient with the food or beverage precursor ingredient—for instance a coffee powder—which is contained into the container compartment.

The second type of connection that is performed between the container and the machine is a mechanical connection, which mechanically links the container to the pump actuator of the machine. The mechanical connection serves to actuate the pump means that are built-in with the container, such that fluid can be withdrawn from the fluid system of the machine, and be conducted through the container compartment as described above.

Once the capsule 42 is inserted into the machine 1 and connected mechanically to the actuator of said machine the fluid connection is performed between the capsule and the machine by moving a fluid connection rod 31 of the machine which is in direct fluid communication with the rest of the machine fluid pipe system 28.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food or beverage preparation machine comprising:
a casing,
a mineralized fluid source,
a receptacle adapted for functionally enclosing at least one food or beverage ingredient container,
a member for conducting a mineralized fluid from the mineralized fluid source to an interior of the at least one food or beverage ingredient container, and
a fluid pipe system that fluidly connects the mineralized fluid source, the member for conducting the mineralized fluid, the receptacle, and a heating and/or chilling device of the machine,
wherein at least one portion of a component selected from the group consisting of (i) the fluid pipe system, (ii) the member for conducting the mineralized fluid, and (iii) the heating and/or chilling device is made of a material selected from the group consisting of a smart memory alloy and a smart memory polymer, the material is designed to reversibly expand or contract above a defined temperature threshold to negate a buildup of scale or other deposits on surfaces of the machine in contact with the mineralized fluid by mechanical action during operation of the food or beverage preparation machine.

2. The food or beverage preparation machine according to claim 1, wherein the mineralized fluid source is a fluid reservoir.

3. The food or beverage preparation machine according to claim 1, wherein the member for conducting the mineralized fluid is a pump.

4. The food or beverage preparation machine according to claim 1, wherein the member for conducting the mineralized fluid is a pump actuator adapted to actuate a pump built-in the container.

5. The food or beverage preparation machine according to claim 1, wherein the defined temperature threshold is in a range of 50° C. to 120° C.

6. The food or beverage preparation machine according to claim 1, wherein the smart memory alloy (SMA) is selected from the group consisting of: Titanium-Nickel alloy (NiTi), copper-aluminium-nickel, and SMAs created by alloying zinc, copper, gold and iron.

7. The food or beverage preparation machine according to claim 1, wherein the mineralized fluid is water.

8. The food or beverage preparation machine according to claim 1, wherein the member for conducting the mineralized fluid inside the container comprises a fluid injection needle.

9. The food or beverage preparation machine according to claim 8, wherein the needle is made entirely of smart memory alloy and/or smart memory polymer material.

10. The food or beverage preparation machine according to claim 1, wherein internal fluid conduits of the heating and/or chilling device are made entirely out of smart memory alloy and/or smart memory polymer material.

11. The food or beverage preparation machine according to claim 1, wherein the fluid pipe system is made entirely out of smart memory alloy and/or smart memory polymer material.

12. The food and beverage preparation machine according to claim 1, wherein the smart memory alloy and/or smart memory polymer material return to an original shape in a temperature range of 65° C. to 80° C.

* * * * *